United States Patent
Buckley et al.

(10) Patent No.: US 6,572,380 B1
(45) Date of Patent: Jun. 3, 2003

(54) GAME APPARATUS AND METHOD FOR TEACHING FAVORABLE BEHAVIOR PATTERNS

(76) Inventors: Kathryn Sue Buckley, 525 Peale Rd., Wimberley, TX (US) 78676; Wilbert Earl Portis, 5310 La Cieniga, San Antonio, TX (US) 78233

( * ) Notice: Subject to any disclaimer, the term of this patent is extended or adjusted under 35 U.S.C. 154(b) by 0 days.

(21) Appl. No.: 09/614,620

(22) Filed: Jul. 12, 2000

(51) Int. Cl.[7] .............................................. G09B 19/00
(52) U.S. Cl. ...................................... 434/238; 434/236
(58) Field of Search ................................ 434/236, 238, 434/237, 365, 420, 433; 273/236, 281, 273

(56) References Cited

U.S. PATENT DOCUMENTS

| | | | |
|---|---|---|---|
| 1,389,162 A | 8/1921 | Reed | |
| 1,631,505 A | 6/1927 | Samis | |
| 1,638,094 A | 8/1927 | Gilmour | |
| 1,695,144 A | 12/1928 | Edwards | |
| 2,883,765 A | * 4/1959 | Blaine | 434/238 |
| 3,035,355 A | * 5/1962 | Holmes | 434/238 |
| 3,782,009 A | * 1/1974 | Darnell | 434/238 |
| 4,440,396 A | 4/1984 | Frudakis | |
| 4,741,701 A | * 5/1988 | Kossor | 434/238 |
| 4,776,799 A | * 10/1988 | Walsh | 434/238 |
| 5,429,373 A | * 7/1995 | Chelko | 273/440 |
| 5,470,235 A | * 11/1995 | Papaleo | 434/238 |
| 5,482,487 A | * 1/1996 | Harris | 446/8 |
| 5,573,404 A | * 11/1996 | Stawski | 434/238 |
| 5,573,405 A | * 11/1996 | Evans | 434/238 |
| 5,577,915 A | * 11/1996 | Feldman | 434/238 |
| 5,697,790 A | * 12/1997 | Garland | 434/236 |
| 5,725,381 A | * 3/1998 | Kollath | 434/238 |
| 5,931,469 A | 8/1999 | Stichnoth | |
| 5,954,512 A | * 9/1999 | Fruge | 434/238 |

\* cited by examiner

*Primary Examiner*—Derris H. Banks
*Assistant Examiner*—Kurt Fernstrom
(74) *Attorney, Agent, or Firm*—Rafael Baca; John Schell (57) ABSTRACT

A game unit and a method for teaching favorable behavioral patterns. The game unit includes a portfolio and an allowance system in cooperative engagement with the portfolio. The portfolio includes a plurality of tab cards and a score unit for receiving the tab cards. The allowance system includes an allowance element as a unit of exchange between what is earned by a player and a tangible reward outside of the play situation. Accordingly, a method for teaching favorable behavioral patterns includes incorporating the game unit with a routine of a player for a predetermined period, such as a daily routine. The player is credited via the tab cards throughout the predetermined period for favorable and unfavorable behavior while performing the routine. At the end of play, a value received from calculating the awarded tab cards is used to determine a value of an allowance element to be received. As such, the allowance element is then redeemed by the player for a tangible reward, such as for example money, a valued play object, or a pleasurable activity.

17 Claims, 3 Drawing Sheets

GAME APPARATUS AND METHOD FOR TEACHING FAVORABLE BEHAVIOR PATTERNS

BACKGROUND OF THE INVENTION

1. Field of the Invention

The present invention generally relate to behavioral development systems and, more particularly, but not by way of limitation, to a game apparatus and method for teaching favorable behavior patterns in social situations.

2. Description of the Related Art

Everyone would agree that the trials of everyday living are difficult and often seem insurmountable. Whether a child has to choose homework over play or a worker chooses to blindly follow a boss' questionable orders, each new situation in life is almost always different. At times, the consequences arising from a bad choice can be personally detrimental and possibly detrimental to others. Most people rely on wisdom gained from choices made from pas experiences to successfully guide them through each new situation.

As such, learning to examine the consequences of one's choices before making a final decision is a learned skill that is often self-realized and is rarely taught by others. Thus, without examining the consequences beforehand, one is likely to continuously make the same detrimental mistake in life.

Ideally, it is best to learn this decision making skill or any behavioral skill at an early age so as to reap full benefits therefrom. However, it is oftentimes quite difficult to a teach a child a rather serious and abstract behavioral skill. Nonetheless, a child is highly responsive to activities associated with play.

Current games in the industry do not teach a broach range favorable behavioral skills, such as examining ones choices or the learning value of money. There are educational board games that address a narrow band of social issues, such as U.S. Pat. No. 4,440,396 to Frudakis for attaining weight loss goals, U.S. Pat. No. 1,638,094 to Gilmour for teaching good hygiene habits, and U.S. Pat. No. 5,931,469 to Stichnoth for treating deviant behavior. Educational board games involve preselected social situations often with the intent of correcting a player's existing social problem, such as losing weight or curbing substance abuse. These board games, however, do not establish favorable behavioral patterns for application in future situations.

Because they involve preselected situations, board games are not interactive in accounting for various everyday events uniquely experienced by individual players in real world social settings. For example, board games do not account for intimate events between a parent and child, such as shopping around town for a toy that a child's playmates have or a child consistently misbehaving with a specific baby sitter.

Physically, board games are not interactive with real world settings in that play pieces must be reset each time the game is relocated. Moreover, board games rarely provide any motivational aspects outside of the actual board game situation and, thus, do not provide tangible rewards for favorable decisionmaking, such as cash.

Accordingly, there is a long felt need for a game apparatus and method for interactively teaching favorable behavior patterns in real work social settings.

SUMMARY OF THE INVENTION

In accordance with the present invention, a game unit, includes a portfolio. The portfolio, in turn, includes a plurality of tab cards and a score unit for receiving the tab cards.

The score unit includes a plurality of play pockets disposed on the score unit for receiving the tab cards and, thus, securing the tab cards to the portfolio. In particular, the score unit includes a playing surface whereby the play pockets are disposed on the playing surface. Similarly, the score unit includes an array of tab pockets for receiving the tab cards so that the tab pockets secure the tab cards to the portfolio.

The preferred embodiment of the portfolio further includes an add-on unit in operative engagement with the score unit although other embodiments may lack the add-on unit. Like the score unit, the add-on unit includes a plurality of add-on play pockets disposed on the add-on unit for receiving the tab cards and, thus, securing the tab cards to the portfolio. Like the score unit, the add-on unit includes an add-on playing surface whereby the add-on play pockets are disposed on the add-on playing surface.

The portfolio includes a linking assembly for operatively linking the add-on unit with the score unit. Furthermore, the linking assembly may facilitate releasable engagement of the add-on unit with the score unit.

The add-on linking member thus joins playing surfaces from the add-on unit with those of the score unit and, alternatively, joins playing surfaces from the add-on unit with those of another add-on unit. Accordingly, the number of playing surfaces is dictated by the number of players so that corresponding add-on units are modularly attached to the score unit as well as other add-on units to define a portfolio for the game unit. It must be added that the preferred portfolio is so dimensioned as to be physically carried by a player from one locale to another, such as in a purse, a pocket or in hand.

Preferably, the tab cards include a set of free cards, a set of star cards, a set of chore cards, and a set of consequence cards. In play, the star cards are awarded to a player for performing favorable acts and the chore cards are awarded for performing favorable tasks. The consequence cards are awarded to a player for performing unfavorable acts. The consequence cards may be include tab subsets. The tab subsets represent a range whereby a card from a predetermined tab subset is awarded in accordance with a corresponding degree of unfavorable behavior.

The game unit further includes an allowance system in cooperative engagement with the portfolio. Inasmuch, the allowance system provides incentive for teaching favorable behavior patterns in the context of a game that is interactive with real world social settings. Additionally, for example, the allowance system enables a young player to learn favorable behavioral skills and the value of money as opposed to conventional methods of simply disbursing a weekly monetary allowance to teach the value of money.

Specifically, the allowance system includes an exchange element as a unit of exchange between what is earned by the player and a tangible reward outside of the play situation. Thus, at the end of play, a value received from calculating the awarded tab cards is used to determine a value of an exchange element to be received. The exchange element(s) is then redeemed by a player for a tangible reward, such as for example money, a valued play object, or a pleasurable activity.

The exchange element preferably comprises a set of play money bills or, commonly, "big bucks" as compensation for what is earned by a player. The exchange element may also comprise a set of play money vouchers or, commonly, "real bucks", which are ideal for players that tend to loose money or big bucks.

Illustratively, a free card for positive credit may be awarded at the start of a game. A chore card for positive credit may be awarded for favorable behavior, such as when a player mows a lawn. A star card for positive credit can be awarded for favorable behavior, such as when a player holds a door for someone at a grocery store. Conversely, a consequence card for negative credit may be awarded for unfavorable behavior, such as when a player throws mud at passing cars. Thus, when calculating a value for awarding an exchange element, each negative credit from the consequence cards nullifies each positive credit earned from the chore, star, and free cards.

At the end of the predetermined period, the game unit is disengaged from the routine of the player. The player's tab cards are tabulated so that a value for awarding an exchange element is determined. Thus, an exchange element is awarded based on the determined value. Preferably, the exchanged element is exchanged for a tangible reward when the player expresses an interest in redeeming the exchange element. It should also be said that exchange elements may be collected over a series of games and then redeemed for a tangible reward of comparably greater value than if redeemed for one game.

It is therefore an object of the present invention to provide a game unit and a method for playing the game unit so that favorable behavioral patterns are taught through interacting with real world social settings.

Still other objects, features, and advantages of the present invention will become evident to those skilled in the art in light of the following.

DETAILED DESCRIPTION OF THE PREFERRED EMBODIMENT

As required, detailed embodiments of the present invention are disclosed herein, however, it is to be understood that the disclosed embodiments are merely exemplary of the invention, which may be embodied in various forms, the figures are not necessarily to scale, and some features may be exaggerated to show details of particular components or steps.

Figure 1:
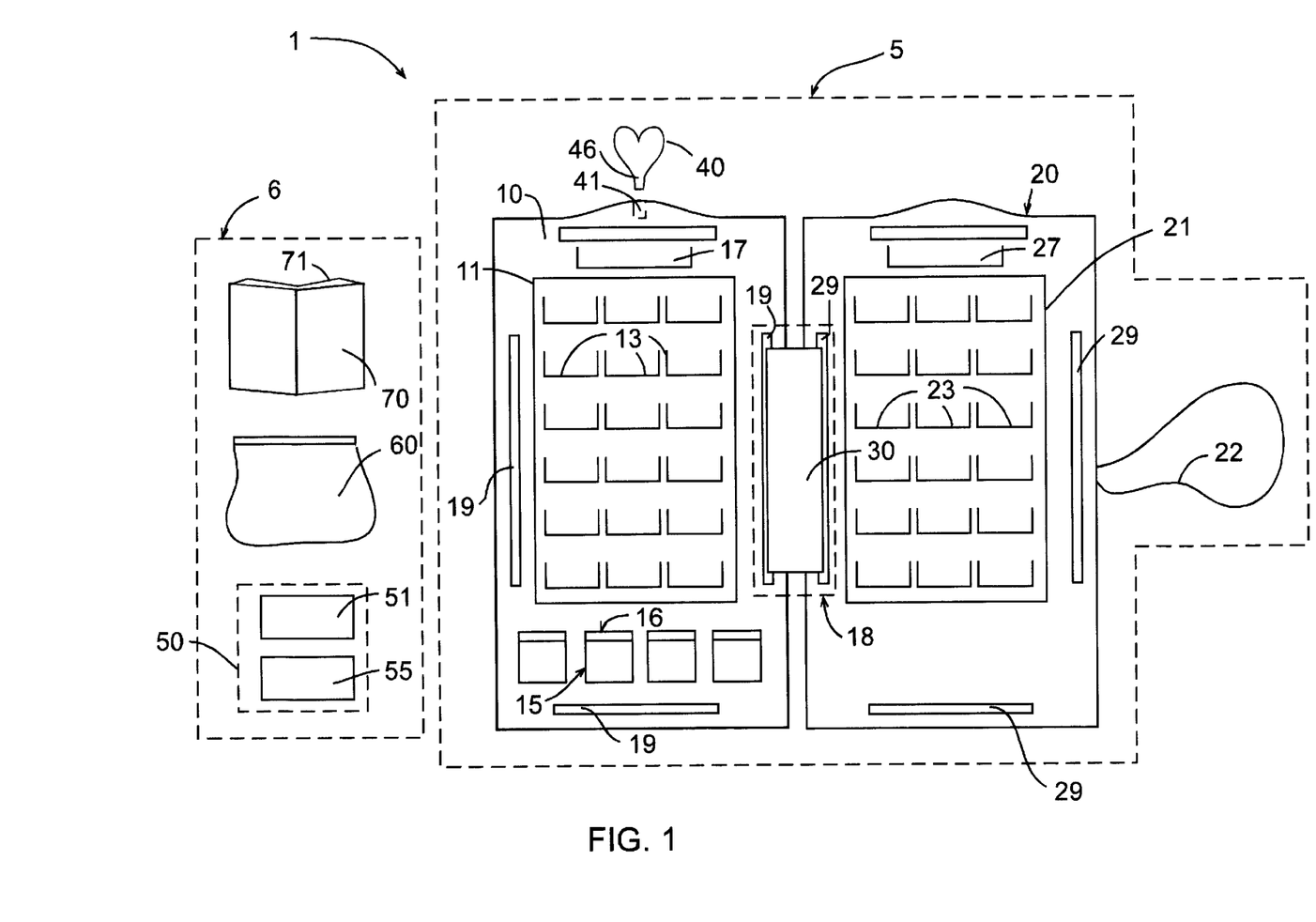
FIG. 1 is a top plan view illustrating a game unit according to the preferred embodiment for teaching favorable behavioral patterns in social situations.
Figure 2:
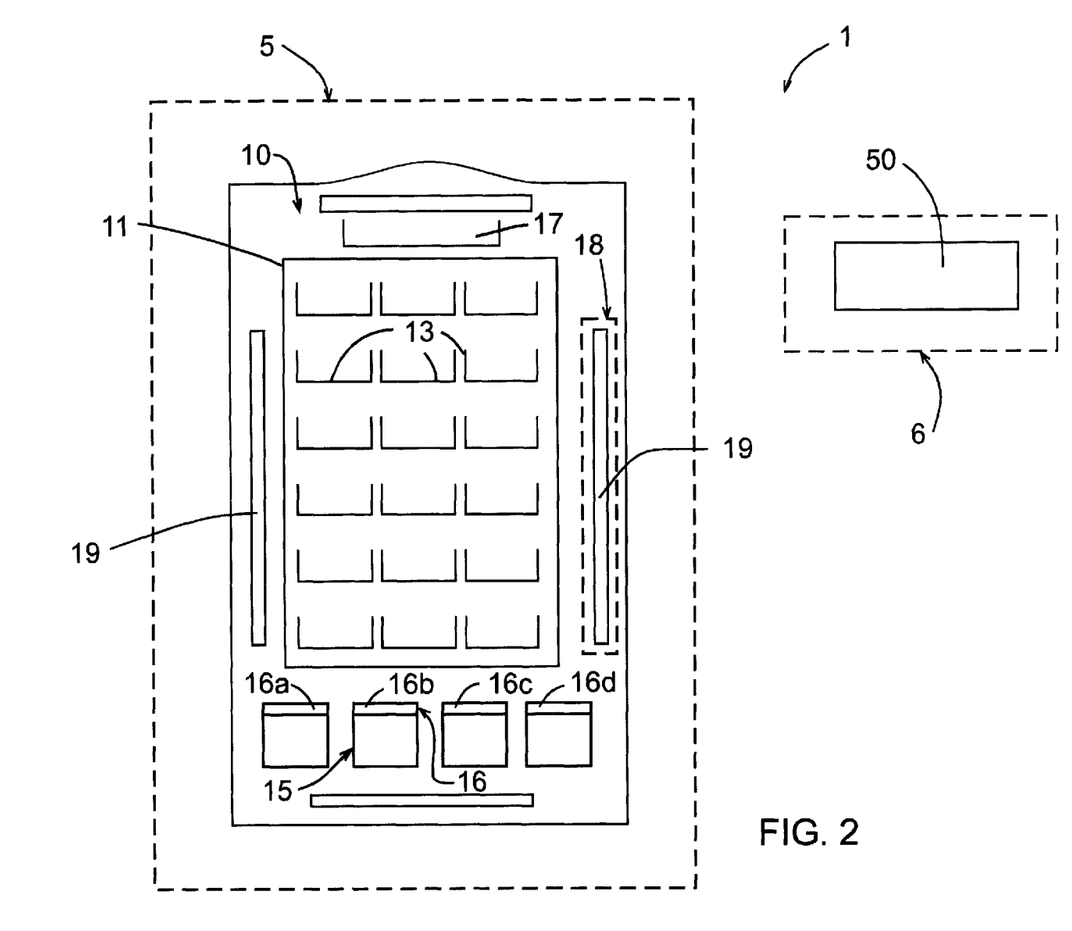
FIG. 2 is a top plan view illustrating an alternative embodiment for a game unit.
Figure 3:
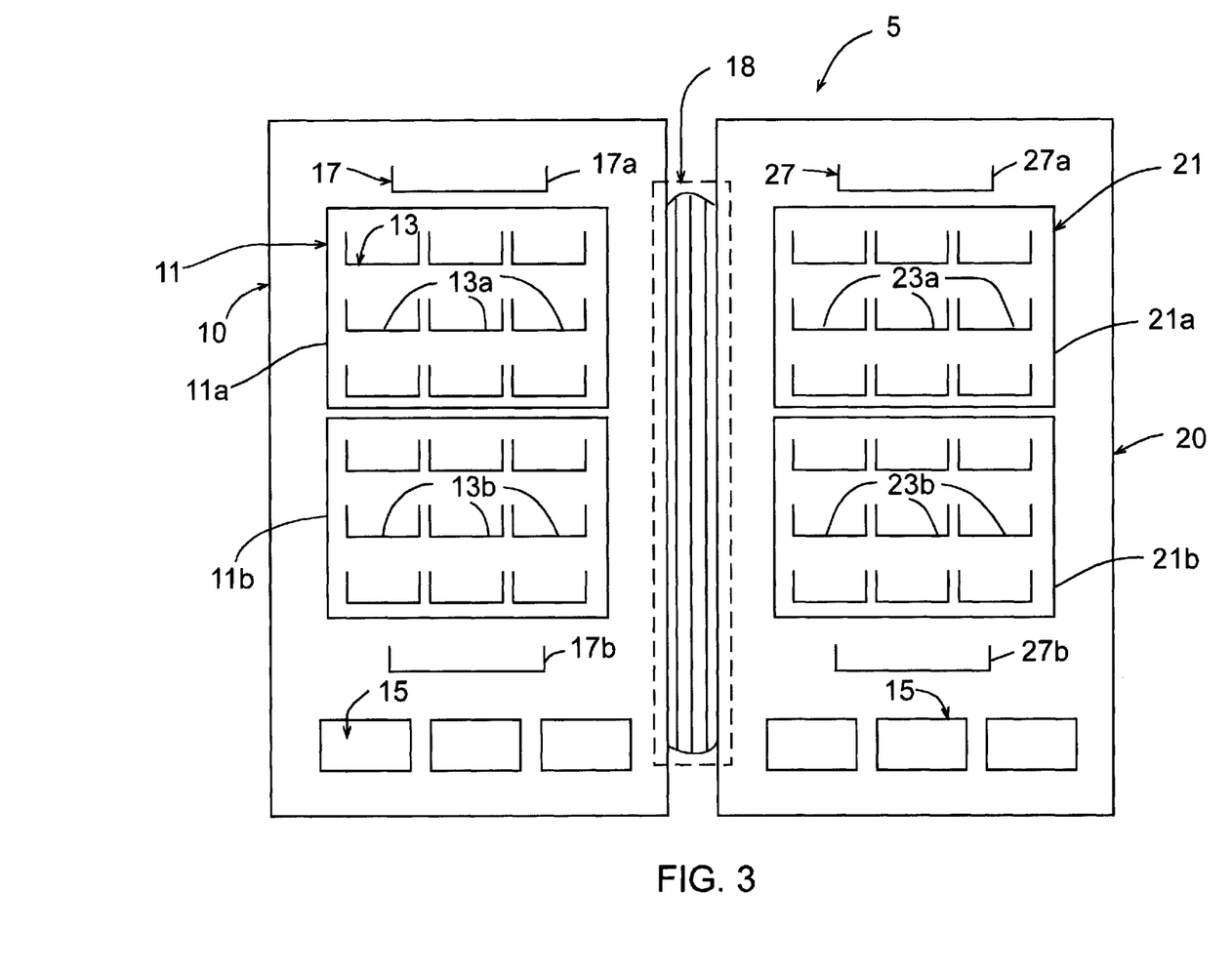
FIG. 3 is a top plan view illustrating an alternative embodiment for a game unit.

In general, FIGS. 1, 2, and 3 illustrate a game unit 1 for interactively teaching favorable behavior patterns in real world social settings. Each game unit 1 includes a portfolio 5 and an allowance system 6 for cooperative engagement with the portfolio 5.

Generally, the portfolio 5 includes a plurality of tab cards 16 for interactively teaching favorable behavior patterns and a score unit 10 for receiving the tab cards 16. As shown in FIGS. 1, 2, and 3, the score unit 10 preferably includes a playing surface 11 disposed along the score unit 10 for receiving the tab cards 16 as the game unit 1 is in play. The playing surface 11 includes a plurality of play pockets 13 disposed thereon. Operatively, the play pockets 13 are so dimensioned as to received and support the tab cards 16 during play. In should be added that, although those of ordinary skill in the art will recognize other spatial arrangements of the play pockets 13 about the playing surface 11, the play pockets 13 are preferably arranged in rows and columns.

The score unit 10 may include a name pocket 17, disposed on the score unit 10, for indicating an individual player's name. Preferably, the name pocket 17 is configured for receiving a card (not shown) with indicia thereon bearing an individual player's name. Inasmuch, the name pocket 17 may be composed of transparent material, such as plastic, for permitting optimal viewing of the card while in the name pocket 17. With respect to the name pocket 17, it should be added that those of ordinary skill in the art will readily recognize other suitable and equivalent means for indicating an individual player's name, such as for example an LCD display.

The score unit 10 may include an array of tab pockets 15 for holding the tab cards 16 that are not in the play pockets 13. As discussed in detail below, the game unit 1 features various types of tab cards 16 so that each type of tab card 16 is preferably held in a corresponding tab pocket 15. Thus, in operation, a tab card appropriate required by the game is pulled from a corresponding tab pocket and is inserted in a play pocket.

In effect, the play pockets 13 as well as the tab pockets 16 each secure the tab cards 15 to the portfolio 5, thereby enabling the game unit 1 to be kept in play even when moved from one locale to another. The play pockets 13 as well as the tab pockets 15 may be composed of transparent material, such as plastic, for permitting optimal viewing of the a tab card positioned therein.

It must also be added that although the score unit 10 in FIGS. 1 and 2 preferably includes tab pockets 15, it is contemplated that other embodiments of the score unit 10 do not feature tab pockets. Moreover, those of ordinary skill in the art will recognize that the portfolio 5 may feature slots instead of pockets, such as the play pockets 15, for receiving the tab cards 15.

The manner for playing the game unit 1 preferably requires that each player be assigned an individual playing surface. Accordingly, as shown in FIGS. 1 and 2, the game unit 1 preferably includes a linking assembly 18 for joining additional playing surfaces with the score unit 10 so that, ultimately, the portfolio 5 includes a series of playing surfaces as dictated by the corresponding number of players. Moreover, a name pocket is preferably positioned substantially adjacent to a corresponding playing surface for facilitating an assignment of each player's name with a corresponding playing surface.

As those of ordinary skill in the art will recognize, the linking assembly 18 may comprise any suitable joining means, such as for example hinges and locks. In particular, the linking assembly 18 includes a linking member 19 disposed on the score unit 10 for operatively linking playing surfaces. Preferably, for the embodiments in FIGS. 1 and 2, the linking member 19 comprises VELCRO.

Illustratively, for a two player embodiment as shown in FIG. 1, an add-on unit 20 having the corresponding add-on playing surface 21 is linked with the score unit 10 to define the portfolio 5. Accordingly, the add-on unit 20 folds out from the score unit 10, thereby exposing, respectively, the add-on playing surface 21 and the playing surface 11 during play.

In general, the add-on unit 20 is structurally similar to the score unit 10. The add-on unit 20 includes the add-on playing surface 21. Like the playing surface 11, the add-on playing surface 21 includes a plurality of add-on play pockets 23 disposed thereon. The add-on play pockets 23 are so dimensioned as to receive and support the tab cards 16 during play.

Like the score unit 10, the ad-on play pockets 23 of the add-on unit 20 are preferably arranged in rows and columns. Those of ordinary skill in the art will recognize other spatial arrangements of the play pockets 13 about the playing surface 11. Identical to the score unit 10, the add-on unit 20 includes an add-on name pocket 17 disposed on the add-on unit 20 for indicating an individual player's name.

The linking assembly 18 further includes an add-on linking member 29 disposed on the add-on unit 20 for operatively linking playing surfaces. In cooperation with the linking member 19 of the score unit 10, the add-on linking member 29 joins playing surfaces from the add-on unit 20 with those of the score unit 10 and, alternatively, joins playing surfaces from the add-on unit 20 with those of another add-on unit 20.

Preferably, for the embodiments in FIGS. 1 and 2, the add-on linking member 29 comprises VELCRO. As such, the linking member 19, the add-on linking member 29, and the binding element 30 facilitate releasable engagement of the add-on unit 20 with the score unit 10, and, thus, permitting modular construction of a portfolio. Additionally, those of ordinary skill in the art will recognize that the add-on linking member 29 may comprise any suitable joining means such as for example hinges or locks.

The linking member 19 and the add-on linking member 29 are each preferably disposed about the periphery of the score unit 10 and the add-on unit 20, respectively. Thus, the preferred manner for joining the score unit 10 with the add-on unit 20 for the game unit 1 of FIG. 1 requires that the score unit 10 and the add-on unit 20 be positioned substantially adjacent to one another.

The linking assembly 18 further includes a binding element 30 for fixed attachment to the linking member 19 and the add-on linking member 29. The score unit 10 is coupled with the add-on unit 20 by attaching the binding element 30 to the linking member 19 and to the add-on linking member 29, respectively. Inasmuch, the linking member 19 and the add-on linking member 29 are structurally identical in that they are both either the hook members or the eyelet members of VELCRO.

The binding element 30 is thus structurally opposite that of the linking member 19 and of the add-on linking member 29 to thereby adhere to the linking member 19 and to the add-on linking member 29 and, thus, joining the score unit 10 with the ad-on unit 20.

In sum, the portfolio 5 of FIG. 1 includes a series of playing surfaces defined by at least one add-on unit 20 extending outwardly from the score unit 10. It is contemplated that each add-on unit can join with another add-on unit to accommodate additional players. Thus, the number of playing surfaces is dictated by the number of players so that add-on units are modularly attached to other add-on units as well as the score unit 10 to define a portfolio for the game unit 1.

It should be added that other embodiments of the game unit 1 contemplate the score unit 10 featuring a plurality of playing surfaces thereon to accommodate additional players. Similarly, other embodiments of the game unit 1 contemplate each add-on unit 20 featuring a plurality of add-on playing surfaces thereon to accommodate additional players.

Although those of ordinary skill in the art will recognize other suitable sizes, preferably the portfolio 5 is portable. As used in this description and in the appended claims, the word portable means that the portfolio 5 is so dimensioned as to be physically carried by a player from one locale to another, such as in a purse, a pocket or in hand. Inasmuch, the portfolio 5 may be rendered in a folded position (not shown) for convenience and for further ensuring the tab cards are secured to the portfolio 5 during transit.

Furthermore, the portfolio 5 may include a securing element 22 for ensuring that the portfolio 5 is rendered in the folded position. As shown in FIG. 1, the securing element 22 preferably comprises an elastic loop, affixed to the add-on unit 20, whereby the elastic loop is stretched and pulled entirely about a portfolio while in the folded position. Those of ordinary skill will recognize other means for ensuring that the portfolio is rendered in the folded position, such as a clasp or a lock.

In general, the allowance system 6 includes an exchange element 50 as a primary unit of exchange between what is earned by players of the game unit 1 and a tangible reward. As discussed in greater detail below, a value received from calculating the tab cards 16 is used to determine a value of an exchange element to be received. In turn, the value of the exchange element is applied toward a value of a tangible reward outside the play situation, such as for example money, a valued play object or a pleasurable activity.

For the embodiment of FIG. 1, as is preferred, the allowance system 6 includes the exchange element 50 that features a first allowance set 51 and a second allowance set 55. In particular, the first allowance 51 set comprises a plurality of play money bills or, commonly, "big bucks", as compensation for what is earned by players of the game unit 1. The second allowance 55 set comprises a plurality of play money vouchers or, commonly, "real bucks". As discussed below, real bucks are thus exchanged for earned big bucks via a predetermined voucher exchange rate.

Although other embodiments use only a single exchange element set, such as for example big bucks, to exchange what is earned from playing the game unit 1 with a tangible reward, it should be added that the second allowance set 55 of FIG. 1 is further provided as a voucher for a tangible reward. Typically, upon a player's request, a voucher is redeemed for a tangible reward, ranging for example from cash to a pleasurable activity. Inasmuch, the second allowance set 55 is ideal for children who may lose money prior to shopping.

Additionally, for the embodiment of FIG. 1, the portfolio 5 may include an indicator 40 for indicating end of play of the game unit 1. As shown in FIG. 1, the indicator 40 includes an indicator coupling element 46 extending outwardly therefrom for securing the indicator 40 to the score unit 10. As such, the score unit 10 defines a unit coupling element 41 for fixedly receiving the indicator coupling element 41.

The allowance system 6 further includes an allowance disbursement container 60 for storing the exchange element 50 prior to disbursal. In the preferred embodiment, the allowance disbursement container 60 comprises a bag, such as for example a bank bag. Moreover, the allowance disbursement container 60 may be so dimensioned as to accommodate storage of the allowance system 6 and, alternatively, the entire game unit 1.

The allowance system 6 further includes an allowance receiving container 70 for holding earned exchange elements 50 until redeemed for a tangible reward. Although those of ordinary skill will recognize equivalent embodiments, such as for example a bag, a wallet or a purse, the preferred allowance receiving container comprises a bank bag featuring a receiving pocket 71 wherein earned exchange elements are stored.

Whereas the embodiments in FIG. 1 and FIG. 3 are for competitive play, i.e. two or more players, the embodiment of FIG. 2 features a game unit 1 for a single player. Accordingly, the allowance system 6 includes an exchange element 50 or big bucks as a primary unit of exchange between what is earned by players of the game unit 1 and a tangible reward. Moreover, the portfolio 5 includes a score unit 10 that is structurally identical to the score unit 10 of FIG. 1. It should be added that, although intended for a single player, the score unit 10 of FIG. 2 preferably features a linking assembly 18 having at least one linking member 19 to potentially accommodate additional players by linking add-on units in a manner described above.

Comparatively, for the embodiment of FIG. 3, the portfolio 5 if similar to that of FIG. 1 and the allowance system 6 (not shown) is identical to that of FIG. 1. Most notably, the linking assembly 18 comprises a hinge for linking the add-on unit 20 with the score unit 10. Accordingly, the hinge does not permit releasable engagement of the add-on unit with the score unit 10.

The portfolio 5 is configured for accommodating up to four players. In particular, the playing surface 11 includes a first score playing surface 11a for one player and includes a second score playing surface 11b for another player, each with a corresponding first score name pocket 17a and a second score name pocket 17b. Likewise, the add-on playing surface 21 includes a first add-on playing surface 21a for one player and includes a second add-on playing surface 21b for another player, each with a corresponding first add-on name pocket 27a and a second add-on name pocket 27b. It should be added that tab pockets 15 are provided by the score unit 10 and the add-on unit 20.

Illustratively, the game unit 1 of FIGS. 1, 2, and 3 is operatively directed toward interactively teaching favorable behavior patterns to children in real world social settings, as is preferred. Those of ordinary skill will recognize that the game unit 1 can be applied to other venues for teaching favorable behavioral patterns such as for example to the mentally impaired, victims of substance abuse or strictly for entertainment with themes for children or for adults.

The preferred method for operating the game unit 1 of FIGS. 1, 2, and 3 is described as follows. In general, the game unit 1 is interactively incorporated with a daily routine of an individual player. As used in this description and in the appended claims, the word routine means a series of acts performed by a player so that the phrase daily routine means a series of acts performed by a player in response to everyday events, such as for example driving a card, bathing, eating, etc. The game unit 1 minimally requires a referee and one player. In the preferred embodiment, the referee comprises a parent and the player comprises a child. Other embodiments contemplate a plurality of referees and/or a plurality of players so long as favorable behavioral patterns are taught.

Thus, a child is credited by a parent throughout each day, via the tab cards 16, for favorable and unfavorable behavior. At the end of the game, the tab cards 16 are tabulated and a daily value is calculated accordingly. Exchange elements are thus awarded with respect to the daily value.

Ultimately, exchange elements are redeemed for a tangible reward. Exchange elements may be collected over a series of games and then redeemed for a tangible reward of comparatively greater value than if redeemed for one game. Preferably, although those of ordinary skill in the art will recognize other periods of play such as weekly or monthly, a new game is played and a daily value is earned for each new day. Inasmuch, a player is given tangible rewards for continuously favorable behavior.

For the game unit 1 of FIGS. 1, 2 as well as FIG. 3, the tab cards 16 are preferably divided into four tab sets 16a–d. A first tab set 16a comprises a set of "free cards" which the child receives at the beginning of each game. In the preferred embodiment, the first tab set 16a or set of free cards is an award of a positive credit in that each game should begin on a positive note.

A second tab set 16b comprises a set of "star cards" which the child receives from a parent for what the parent deems as a favorable act, such as for example sharing with another, finishing homework, doing a good deed or showing kindness, working out solutions and comprises or making a good choice. A third tab set 16c comprises a set of chore cards which the child receives from a parent for performing favorable tasks, such as for example performing chores within a household such as washing the dishes or cleaning a room; helping out in other households such as mowing a grandparent's lawn; or performing chores outside a household situation such as planting trees at a playground.

The star cards of the second tab set 16b and the chore cards of the third tab set 16c each count for positive credit in play. In sum, following the above described guidelines for awarding chore and star cards, a parent interactively awards cards to each player from the second tab set 16b and from the third tab set 16c as various events occur throughout each day.

The fourth tab set 16d comprises a set of consequences or "examine your choices" cards which the child receives from a parent for what the parent deems as an unfavorable act, such as for example being told to perform a task more than once, name calling or fighting in a car. Unfortunately, children are conventionally punished for unfavorable behavior by methods which potentially foster long-term psychologically adverse or violent behavioral patterns toward a parent-child relationship, such hitting or yelling at a child. Alternatively, the fourth tab set 16d does not adversely punish a player but asks the player to examine what unfavorable behavioral act merits awarding a consequence card from the fourth tab set 16d so as not to repeat that act in the future.

As such, each consequence card counts as negative credit in play. When calculating a daily value, each negative credit from the consequence cards nullifies each positive credit earned from the chore, star, and free cards. Thus, to optimize a daily value, there is an incentive for each player to curb unfavorable behavior that potentially triggers awarding negative credit, hence "examine you choices" cards.

Illustratively, one boy playing the game unit 1 would be less likely to retrieve a baseball glove from another through violence by realizing that such an act would diminish the daily value from which that boy would like to use toward the purchase of a new baseball bat. Alternatively, to obtain a positive credit via a star card, that boy is more likely to politely ask for that baseball glove. Inasmuch, by restricting access to something that a player whishes to have, such as a new baseball bat or use of a favorite video game cartridge, the game unit 1 acts as a deterrent against future unfavorable acts.

At the end of play, a referee derives the daily value by subtracting total negative credits earned from total positive credits earned. Should the daily value be for positive credit, exchange elements 50 are awarded via the predetermined daily value exchange rate. The daily value exchange rate thus converts positive credit to a value for which an exchange element is awarded. Once a daily value is awarded, play of the game unit 1 is over in that the tab cards 16 are removed from the play pockets 13 and/or add-on play pockets 23 so that credit from the tab cards 16 does not carry over to the next game.

Exchange elements are not awarded should the daily value be for negative credit or no credit. On the other hand, a player is not penalized for receiving a daily value for negative or no credit. At the end of the game, a player's debt does not carry over to the next game. Accordingly, a player is encouraged by the referee to make better choices in the next game.

Although negative credit is awarded in play, consequence cards represent tangible feedback that is well received by players, especially from children. The game unit 1 is responsive to children whereby children are highly motivated by tangible rewards, such as cards, play money, toys, and candy. A child is thus favorably responsive to receiving any tangible card albeit a consequence card for negative credit.

Accordingly, a child is more likely to learn from a pleasurable experience, such as receiving a consequence card, rather than being threatened or punished for unfavorable behavior. Moreover, awarding of tangible tab cards for positive and negative credit to other players in competitive play greatly motivates all players to strive toward optimizing their daily values.

It must be added that the fourth tab set 16b may include a plurality of tab subsets. The plurality of subsets represent a range of negative credit to be awarded in play. Each subset represents a predetermined amount of negative credit to be awarded in accordance with a corresponding unfavorable act. A greater amount of negative credit is thus awarded with increasingly unfavorable behavior.

Illustratively, a first tab subset from the plurality of tab subsets represents one negative credit. For example, one negative credit corresponds to such unfavorable behavior as telling a player to perform a daily task more than once, such as doing homework. A second tab subset from the plurality of tab subsets represents two negative credits. For example, two negative credits corresponds to such unfavorable behavior as a player using foul language. A third tab subset from the plurality of tab subsets represents unfavorable behavior as a player fighting with others in a car.

Specifically, play of the game unit 1 of FIG. 1 is as follows. The game unit 1 of FIG. 1 is configured to accommodate two players: a first player for play on the playing surface 11 and a second player for play on the add-on playing surface 21. A referee interactively awards tab cards 16 to the first player and to the second player for favorable and unfavorable acts by each individual player during the course of the day.

For each act, the referee will retrieve the appropriate tab card 16 from the corresponding tab pocket 15. Thus, for the first player, the referee will insert the appropriate tab card from the tab cards 16 into a play pocket from the play pockets 13 on the playing surface 11. Alternatively, for the second player, the referred will insert the appropriate tab card from the tab cards 16 into an add-on play pocket from the add-on play pockets 29 on the add-on playing surface 21. Preferably, the tab cards are inserted into play pockets or add-on play pockets from left to right although those of ordinary skill in the art will recognize other suitable arraignments of tab cards about the play and add-on play pockets.

For example, the referee will award a chore card to the first player for cleaning her room by drawing the core card from the tab cards 16 and inserting the chore card into a play pocket from the play pockets 13. The referee, for example, will award a consequence card to the second player for throwing mud at passing cards by drawing a consequence card from the tab cards 16 and inserting the consequence into an add-on play pocket 23 from the add-on play pockets 23. Additionally, at the start of the game, the referee will award a free card from the tab cards 16 to each player to preferably begin the game on a positive not, via a free positive credit.

At the end of play, the referee will inform the first and second player that the game has ended and, thus, no more tab cards will be awarded. The referee at the end of play derives a daily value and awards exchange elements for positive credits earned. For the game unit 1 of FIG. 1, exchange elements 50 from the first allowance set 51 or big bucks are awarded for the derived daily value.

Specifically, the referee draws each exchange element 50 from the allowance disbursement container 60 for presentment to the first and/or the second player. Preferably, for the game unit 1 of FIG. 1, the first and the second allowance sets 51, 55 are stored in the allowance disbursement container 60 until drawn by the referee. At such, earned big bucks from the first allowance set 51 are saved by each player.

Accordingly, each player is preferably assigned an allowance receiving container. Each allowance receiving container 70 stores awarded big bucks until each corresponding player expresses an interest to the referee in redeeming the big bucks for a tangible reward.

Once a player expresses an interest in redeeming big bucks, the referee facilitates an ad hoc exchange of exchange elements from the first allowance set 51 for exchange elements from the second allowance set 55 via a predetermined voucher exchange rate.

The referee determines the exchange rate. For example, if a player wants cash, the referee may designate the voucher exchange rate of five big bucks for $3 in currency. Exchange elements from the second allowance set 55 or real bucks are thus awarded as vouchers for $3. Similarly, real bucks can be used as vouchers for other tangible rewards, whereby, for example, a real buck voucher for French fries is received in exchange for five big bucks. Again, real bucks are ideally contemplated for children who may lose money prior to shopping. Furthermore, each allowance receiving container 70 stores awarded real bucks until redeemed for a tangible reward.

Optionally, at the end of play of the game unit of FIG. 1, the referee secures the indicator 40 to the portfolio 5 by linking, respectively, the indicator coupling element 46 with the unit coupling element 41. The indicator 40 provides visual confirmation to players that the game has ended as well as psychologically reinforces favorable behavioral patterns.

In particular, as shown in FIG. 1, the indicator 40 preferably comprises a heart-shaped configuration. Moreover, the indicator 40 may feature indicia thereon with information pertaining to reinforcing favorable behavioral patterns. For example, the indicia may comprise the acronym "H.E.A.R.T." which bears the message "I Honor you, I Encourage you, I Appreciate you, I Respect you, and, above all, I Truly love you." Accordingly, at the end of play, the referee secures the indicator 40 to the portfolio 5 and reads the indicia aloud to the players.

To enhance competitive play, it should be added the referee may assign a color for each player, whereby various elements of the game unit 1, such as each respective playing surface, allowance receiving container, and/or exchange elements are correspondingly colored to accommodate each players assigned color. Thus, if the first player is assigned the color blue, various elements of the game unit 1, such as the playing surface 11, may be colored blue. Likewise, if the second player is assigned the color pink, the allowance receiving element 70 may be colored pink. Moreover, indicia, such as merchandising information or reference information useful to a player, may be provided on the game unit 1, especially about each playing surface, to further enhance play. It must be also be added that play of the game unit of FIG. 3 is the same as that of FIG. 1 described above.

Play of the game unit 1 of FIG. 2 is as follows. The game unit 1 of FIG. 2 is configured to accommodate one player for play on the playing surface 11. A referee interactively awards tab cards 16 to the player for favorable and unfavorable acts by the player during the course of the day.

For example, in a similar manner as described for the game unit 1 of FIG. 1, the referee will award a star card to the player for sharing her nachos with her cousin by drawing a star card from the tab card 16 and inserting the star card into a play pocket from the play pockets 13. Thus, the above mentioned guidelines for awarding star, chore, consequence, and free cards apply equally to each game unit 1 of FIG. 1 and of FIG. 2.

For each act, the referee will retrieve an appropriate tab card 16 from the corresponding tab pocket 15. Thus, the referred will inset the appropriate tab card from the tab cards 16 into a play pocket from the play pockets 13 on the playing surface 11.

Preferably, the tab cards 16 are inserted into play pockets 13 from left to right. Those of ordinary skill in the art will recognize other suitable arrangements of the tab cards 16 about play pockets 13.

At the end of play, the referee will inform the player that game has ended and, thus, no more tab cards 16 will be awarded. The referee derives a daily value and awards exchange elements 50 or big bucks for positive credits earned.

Specifically, the referee draws exchange element elements from the allowance disbursement container 60, where the exchange elements are preferably stored, and given to the player. In turn, the player is preferably assigned an allowance receiving container 70 for storing awarded big bucks until redeemed. The player then redeems the exchange elements for tangible rewards, such as for example cash.

Unlike the second allowance set 55 for the game unit 1 of FIG. 1, the exchange elements 50 or big bucks of FIG. 2 are redeemed directly for a tangible reward without the referee making additional exchanges via a predetermined voucher exchange rate.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

We claim:

1. A method for teaching positive behavioral patterns to a player, the method comprising:
   placing a free card in one of a plurality of play pockets at the beginning of a game period, the free card representing a positive value;
   placing a star card in one of a plurality of play pockets in response to a positive behavioral action of the player, the star card representing a positive value;
   placing a chore card in one of a plurality of play pockets in response to a completion of an assigned task by the player, the chore card representing a positive value;
   placing a consequence card in one of a plurality of play pockets in response to a negative behavioral action by the player, the consequence card representing a negative value;
   summing the values to determine an amount of first allowance elements to award to the player at the end of the game period;
   accumulating amounts of first allowance elements over one or more game periods;
   exchanging the accumulated amounts of first allowance elements award over the one or more game periods for an amount of second allowance elements in accordance with a predetermined exchange rate, the second allowance elements representing a tangible reward; and
   coupling an indicator to a game unit at the end of the game period.

2. The method of claim 1, wherein the plurality of play pockets are located on a game unit.

3. The method of claim 1, wherein the plurality of play pockets are located an add-on game unit.

4. The method of claim 1, wherein the negative value represented by the consequence card is associated with a degree associated with the negative behavioral action.

5. The method of claim 1, wherein the first allowance elements are play money bills.

6. The method of claim 1, wherein the first allowance elements are play money vouchers.

7. A game for teaching positive behavioral patterns to a player, the game comprising:
   a game unit, the game unit comprising:
     a plurality of play pockets disposed on the game unit; and
     a plurality of play cards comprising:
       at least one free card operative for placement in at least one play pocket of the plurality of play pockets at the beginning of a game period, the at least one free card representing a positive value;
       at least one star card operative for placement in at least one play pocket of the plurality of play pockets in response to a positive behavioral action by the player, the at least one star card representing a positive value;
       at least one chore card operative for placement in at least one play pocket of the plurality of play pockets in response to a completion of an assigned activity by the player, the at least one chore card representing a positive value; and
       at least one consequence card operative for placement in at least one play pocket of the plurality of play pockets in response to a negative behavioral action by the player, the at least one consequence card representing a negative value;
   a plurality of exchange elements comprising:
     a first allowance set comprising a plurality of first allowance set elements, the first allowance set elements awarded to the player at the end of the game period in accordance with an accumulation of values of play cards placed in the plurality of the play pockets during the game period;
     a second allowance set comprising a plurality of second allowance set elements, the second allowance set elements awarded in exchange for awarded first allowance set elements, the second allowance set elements representing tangible rewards; and an allowance receiving container for storing awarded allowance set elements; and an indicator for indicating the end of the game period wherein the indicator couples to the game unit.

8. The game of claim 7, wherein a plurality of players participate, a game unit and allowance receiving container being associated with each player of the plurality of players.

9. A game for teaching positive behavioral patterns to a player, the game comprising:

a game unit, the game unit comprising:
 a plurality of play pockets disposed on the game unit; and
 a plurality of play cards comprising:
  at least one free card operative for placement in at least one play pocket of the plurality of play pockets at the beginning of a game period, the at least one free card representing a positive value;
  at least one star card operative for placement in at least one play pocket of the plurality of play pockets in response to a positive behavioral action by the player, the at least one star card representing a positive value;
  at least one chore card operative for placement in at least one play pocket of the plurality of play pockets in response to a completion of an assigned activity by the player, the at least one chore card representing a positive value; and
  at least consequence card operative for placement in at least one play pocket of the plurality of play pockets in response to a negative behavioral action by the player, the at least one consequence card representing a negative value;
a plurality of exchange elements comprising:
 a first allowance set comprising a plurality of first allowance set elements, the first allowance set elements awarded to the player at the end of the game period in accordance with an accumulation of values of play cards placed in the plurality of the play pockets during the game period;
 a second allowance set comprising a plurality of second allowance set elements, the second allowance set elements awarded in exchange for awarded first allowance set elements, the second allowance set elements representing tangible rewards; and
 an allowance receiving container for storing awarded allowance set elements;

wherein a plurality of players participate, a game unit and allowance receiving container being associated with each player of the plurality of players; and wherein a game unit and allowance receiving container associated with one player in the plurality of players have a common color indicative of the one player in the plurality of players.

10. The game of claim 9, the game further comprising:
at least one means for linking the game unit to another game unit.

11. The game of claim 9, the game further comprising:
at least one releasable linking assembly.

12. The game of claim 1, wherein the game unit is modular.

13. The game of claim 12, wherein the game unit is compact.

14. The game of claim 12, wherein the game unit fits in a player's pocket.

15. The game of claim 12, wherein the game unit fits in a player's purse.

16. The game of claim 1, wherein the first allowance set comprises play money bills.

17. The game of claim 1, wherein the first allowance set comprises play money vouchers.

* * * * *